Figures 1, 2:
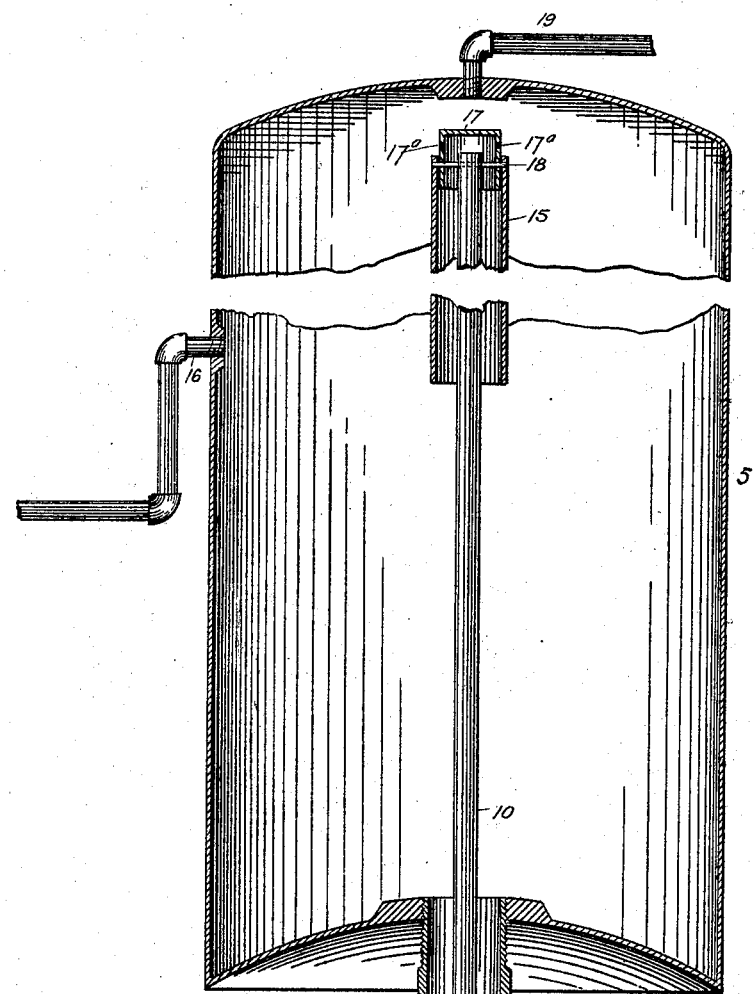

No. 608,148. Patented July 26, 1898.
R. A. BROOKS.
HOT WATER CYLINDER AND VALVE MECHANISM AND CONNECTIONS THEREFOR.
(Application filed Sept. 14, 1897.)
(No Model.) 2 Sheets—Sheet 1.

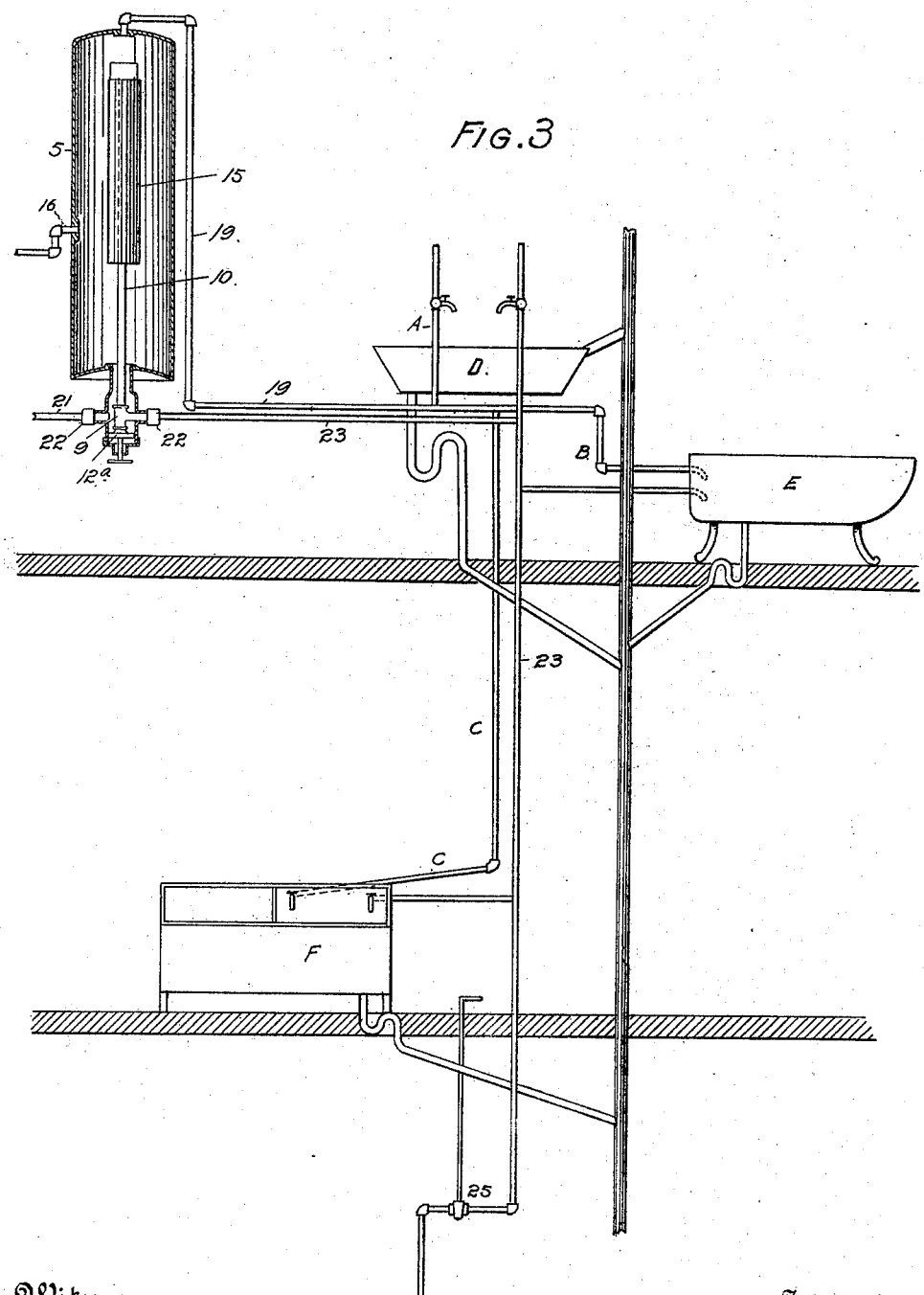

UNITED STATES PATENT OFFICE.

ROBERT A. BROOKS, OF CHICAGO, ILLINOIS.

HOT-WATER CYLINDER AND VALVE MECHANISM AND CONNECTIONS THEREFOR.

SPECIFICATION forming part of Letters Patent No. 608,148, dated July 26, 1898.

Application filed September 14, 1897. Serial No. 651,699. (No model.)

*To all whom it may concern:*

Be it known that I, ROBERT A. BROOKS, a citizen of the United States of America, residing at Chicago, in the county of Cook and State of Illinois, have invented certain new and useful Improvements in Hot-Water Cylinders and Valve Mechanism and Connections Therefor; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in hot-water cylinders, together with valve mechanism and connections therefor, whereby the cold-water-supply pipe is also made the drain-pipe for the cylinder.

My object is to provide a construction of this class which shall be more simple and economical than those heretofore used and at the same time superior from a sanitary standpoint.

To these ends the invention consists of the features, arrangements, and combinations hereinafter described and claimed, all of which will be fully understood by reference to the accompanying drawings, in which is illustrated an embodiment of the invention.

In the drawings, Figure 1 is a vertical section taken through a hot-water cylinder equipped with my improvements. In this view the greater portion of the cylinder is broken away, the top and the portion below the return from the range or heater only being shown. Fig. 2 is a section taken on the line $x\,x$, Fig. 1. Fig. 3 illustrates a cylinder equipped with my improved valve mechanism, together with the ordinary house fixtures and connections. In this view the valve 12 is shown closed, while in Fig. 1 the corresponding valve is shown open.

Similar reference characters indicating corresponding parts in the views, let the numeral 5 designate the hot-water cylinder, whose bottom is provided with a threaded opening, into which is screwed a casing 6, having hollow shanks or tubular projections 7 and 8, located on opposite sides. Located within this casing is a three-way T-shaped device 9. The passage-way $9^a$ of this device registers with and is a continuation of the passage-way in the shank 7. The T-head of this device 9 is open at both ends. Into its upper extremity is screwed the lower extremity of a vertical open-ended pipe 10, which passes upwardly into the cylinder. The upper extremity of this pipe is located in the top portion of the cylinder. The lower end of the T-head 9 is normally closed by a valve 12, which is provided with an enlarged cylindrical portion or core $12^a$, exteriorly threaded to engage a female thread formed in the lower portion of the casing 6. Upon the lower open end of this casing, which is provided with a male thread, is screwed a cap 13, having an open reduced lower portion or neck $13^a$, provided with a male thread, upon which is screwed a stuffing-box 14, surrounding the valve-stem $12^c$. To the outer protruding portion of this stem is applied a cross-piece or handle $12^d$ for convenience in manipulating the valve, which is opened and closed by turning in the one direction or the other, as may be required.

Surrounding the pipe 10 is an open-ended pipe 15, which extends from the top of the pipe 10 downwardly to a point below where the pipe 16 from the range or other heater communicates with the cylinder. In the top of the pipe 15 is inserted a cap 17, having orifices $17^a$ in its upper portion. The two pipes 10 and 15 and the cap 17 are connected by a pin 18, which passes through registering apertures formed in the connected parts. The pipe 15 is considerably larger than the pipe 10, and thus forms a passage-way around the pipe 10 for conducting the cold water as it leaves the upper extremity of the pipe 10 downwardly to a point below the pipe 16, through which the hot water enters the boiler or cylinder.

The hot water is taken from the top of the cylinder by way of a pipe 19, by means of which and its branches A, B, and C the hot water may be distributed or carried to the various fixtures of the house requiring hot-water service, as the sink D, the bath-tub E, and laundry-vats F.

The outer extremity of the valve-casing shank 7 is ground interiorly to receive the correspondingly-ground conical interior extremity of a tailpiece 20, having a collar 20ª, which is engaged by an interior annular flange formed on a coupling-sleeve 22, which is screwed upon the outer extremity of the shank 7 and through whose agency a water-tight joint between the tailpiece 20 and the shank 7 is formed. The opposite shank is connected with a similar tailpiece 21, having a collar 21ª, engaged by a coupling-sleeve 22, which is screwed on the outer extremity of the said shank.

When my improved apparatus is in use, the valve 12 is normally closed and the tailpiece 20 is connected with the lead cold-water-service pipe 23. The tailpiece 21 is suitably connected with a pipe (not shown) leading to the stove, range, or other heater. Assuming that the valve 12 is closed, the cold water passes from the pipe 20 into the T-shaped device 9, and thence upward through and to the top of the pipe 10, where it is discharged into the upper extremity of the outer pipe 15, which carries it downwardly below the pipe 16 and discharges it into the lower portion of the cylinder, whence it passes into the open upper end of the casing 6, (which is much larger than the pipe 10,) and thence through the shank 8 and the pipe 21 to the pipe 24, leading to the range or heater, and thence by way of the pipe 16 into the cylinder at a point above the lower extremity of the pipe 15. The relative points for the entrance of the hot water to the cylinder and for the discharge of the cold water thereinto are arranged, as stated, to prevent the hot water from mingling with the cold water. By discharging the hot water into the boiler at a point above the lower extremity of the outer pipe this purpose is accomplished, since the hot water will naturally rise to the top of the cylinder, while the cold water, by reason of its greater specific gravity, will naturally move downward.

In case it is desired to cut off the water by turning the wasteway stop-cock 25 below in the service-pipe for the purpose of draining the pipes to prevent freezing or for any other purpose the water in the boiler cannot siphon out below the vent-orifices 17ª, since as soon as the water-level is lowered sufficiently to expose said orifices the air will enter and break the vacuum or partial vacuum necessary in siphoning. If it were not for the vent-orifices 17ª, the water in the boiler might siphon out to the level of the bottom of the pipe 15, which is not desirable, since the greater portion of the boiler would then be free from water and, being heated, might cause an explosion when the water was again turned on. The cold-water pipe 10 is carried to the top of the boiler to prevent the siphoning out of the water in the boiler when the valve 25 is closed and a faucet open at some point in the system below the bottom of the boiler. If the upper extremity of the pipe 10 only reached to the bottom of the boiler, the boiler might be completely emptied by siphonage when the valve 25 is closed and a fixture-faucet open at some point below the bottom of the boiler. The boiler might then become unduly heated without the knowledge of the person in charge of it, and an explosion might result by turning cold water thereinto. When, however, it is desired to drain the boiler as well as the other pipes, the valve 12 is opened, as shown in Fig. 1, thus allowing the water in the boiler to enter the lower open end of the T-head 9 and pass thence into and through the shank 7 and the tailpiece 20, and thence downwardly into the service-pipe and out into any fixture below the bottom of the cylinder, as the bath-tub or laundry-tray. Hence in this case the cold-water service-pipe becomes also the conduit for draining the boiler or the hot-water cylinder, thus obviating the necessity of a separate drain-pipe leading from the boiler to the sewer-pipe.

If desired, an opening may be formed in the casing 6 and a faucet inserted for the purpose of drawing off water at this point. As this feature is not new, it is not thought necessary to illustrate it.

It is evident that my improvements may be used to equal advantage with the present form of hot-water cylinder, providing one of the two openings in the top of the latter be stopped.

The hole in the bottom of the cylinder should be large enough to receive the pipes 10 and 15 and their attachments when connected in suitable operative relation.

The male threads on the shanks 8 and 7 should be made standard size for the connection of iron pipes as well as lead.

Having thus described my invention, what I claim is—

1. The combination with a hot-water cylinder and a conduit leading from the heater to the boiler, of a casing attached to the bottom of the cylinder and communicating therewith, said casing being provided with an inlet for the cold water from the service-pipe, and an exit to allow the water to pass to the range or heater, a device located within said casing and having three openings, one of which registers with the cold-water inlet, a valve normally closing another opening of said device, a pipe communicating with the third opening of said device and passing upwardly into the cylinder to a point in suitable proximity to the top thereof, and a conduit communicating with the top of the said pipe and leading downwardly to a point below the hot-water entrance to the cylinder, the upper part of the pipe being vented to prevent siphonage.

2. The combination with a hot-water cylinder and a conduit leading from the heater to the boiler, of a casing attached to the bottom of the cylinder and communicating therewith, said casing also having an inlet for the cold water from the service-pipe, and an outlet to allow the water to pass to the range or heater, a device located within the said casing and having three openings, one of which registers with the opening in the casing for the entrance of the cold water, a valve located in the casing for closing another of said openings, a pipe communicating with the third opening of said device and passing upwardly into the cylinder to a point in suitable proximity to the top thereof, an outer pipe surrounding the first-named pipe and extending downwardly to a point below the hot-water entrance to the cylinder, the said outer pipe communicating with the upper extremity of the inner pipe, the said pipes being vented to prevent siphonage, and suitable means for connecting the two pipes.

3. The combination with the cylinder and a conduit leading from the heater thereto, of a casing having an opening communicating with the cylinder, an inlet-pipe for the cold water from the service-pipe, an exit-pipe to allow the water to pass to the range or heater, a device located within said casing and having three openings, one of which registers with the cold-water-inlet pipe of the casing, a valve adapted to close another opening of said device, and a cold-water pipe leading upward into the cylinder and communicating with the third opening in the casing.

4. The combination with a hot-water cylinder, of a casing having an opening adapted to communicate with the cylinder, and an inlet-opening for the cold water from the service-pipe, a device located within said casing and having three openings, one of which registers with the casing-inlet, a valve for controlling another opening of said device, and a cold-water pipe leading upward into the cylinder and communicating with the third opening of the casing.

In testimony whereof I affix my signature in presence of two witnesses.

ROBERT A. BROOKS.

Witnesses:
J. H. GROOMS,
MARGARET GROOMS.